United States Patent Office 3,096,289
Patented July 2, 1963

3,096,289
DIELECTRIC PLASTIC
Michael Joseph D'Errico and Mary Margaret Timney, Stamford, Conn., assignors to American Cyanamid Company, New York, N.Y., a corporation of Maine
No Drawing. Filed Aug. 11, 1961, Ser. No. 130,762
4 Claims. (Cl. 252—63.2)

The present invention is concerned with a novel composition of matter. More particularly, it deals with the provision of a highly cyanoethylated material comprising a cyanoethylated cellulose of a high degre of substitution and cyanoethylated hydroxyethyl cellulose useful as a dielectric composition.

Cellulose, both natural and regenerated, has been reacted with acrylonitrile in varous ways to produce cyanoethylated derivatives. Physical properties of the resultant products vary with the nature of the cellulose, its molecular weight, the method of treatment and the like. However, they are determined most noticeably by the extent to which the cellulosic material has been cyanoethylated. This latter usually is defined in one of two ways, either by a nitrogen analysis, expressed in weight percent, or by a decimal fraction representing the number of cyanoethyl groups introduced per anhydroglucose unit. This decimal fraction usually is referred to as the "degree of substitution." For purposes of simplification, in this discussion the latter will be abbreviated as $DS_c$. Both terminologies are used in this specification. Complete cyanoethylation corresponds to a nitrogen content of about 13.1 percent nitrogen and a $DS_c$ of three.

At low degrees of substitution, i.e., a $DS_c$ up to about two, cyanoethylation of cellulose does not greatly alter its physical appearance, the fibrous characteristics being largely retained. However, as $DS_c$ values become higher, the characteristics of the product beging to change. As the $DS_c$ increases above about two, the loss of fibrous characteristics and the resemblance of the product to a thermoplastic become increasingly noticeable. Moreover, the product begins to become soluble in certain organic solvents.

These characteristics become dominant in products having a $DS_c$ above about 2.0 which correspond approximately to nitrogen content percentages of about 10.5% up to something over 13%. It is with products of this highly-cyanoethylated type that the present invention is particularly concerned. Again for purposes of simplification, in this discussion such products will be referred to using the abbreviation "HCC." Such products, particularly those having a $DS_c$ above about 2.3, have very desirable electrical characteristics for a number of purposes. Among these are a high dielectric constant and a relatively low dissipation factor.

This combination of properties has led to consideration of the possible application of HCC films, in the fabrication of electroluminescent devices. In essence, such a device is comprised of two electrodes, at least one of which transmits light, between which a phosphor is embedded in a suitable matrix. A requirement for the matrix is that it have a high dielectric constant [S. Roberts, J. Opt. Soc. Am. 42, 850 (1952)]. Among the dielectric matrices for electroluminescent phosphors that have been suggested are the ethers of cellulose, for example in U.S. Patents 2,774,004, 2,792,447, 2,918,594 and 2,901,652. The latter in particular suggests cyanoethylated cellulose as a preferred material of high dielectric constant.

To be wholly satisfactory for such purposes, the matrix must have a dielectric constant of at least about nine, preferably higher. To attain this value in HCC ordinarily requires a $DS_c$ of about 2.0 or higher, corresponding to a nitrogen content of at least about 10.5 percent. It is also clear that the dissipation factor should be as low as possible since it represents waste of electrical energy into unwanted heat. The dissipation factor should be below about 0.1 and preferably below about 0.04. This, in turn, requires that the HCC, to be suitable for the purpose, must be free from ionic impurities to a high degree. The concentration of such impurities should be less than about 200 parts per million and preferably not more than about 50 p.p.m. In addition, such products should be substantially water-white to be capable of transmitting the visible light emitted by the phosphor.

Unfortunately, the proposed use in electroluminescent devices of a grade of HCC which exhibits the combination of desired electrical properties and lack of color has been hampered by several problems. Probably the most serious are the inadequacy of the HCC solutions to easily disperse the phosphor and the poor degree of adhesion of such HCC to the conductive coating on the electrode (such an electrode typically being glass or some equivalent transparent or translucent non-conductor having a conductive coating consisting of a tin oxide film as shown in U.S. Patent 2,838,715, for example). In order to get good electrical contact, the minimum adhesion of the phosphor-containing matrix to the conductive coating on the glass must be sufficient to insure that the matrix film will not spontaneously peel from the conductive surface during the drying of the film which follows its casting from solution or spraying, etc. onto the electrode. While the desired quality grade of HCC exhibits adequate adhesion to the glass or its equivalent, it frequently gives unsatisfactory results when films are cast on the layer of tin oxide or its equivalent which comprises the electrode surface on the so-called "conductive glass."

Furthermore, the film obtained using a suitable grade of HCC often is pitted and uneven due to poor dispersibility of phosphor therein, and has less strength and toughness than are desirable. While the shortcomings of the film are not as serious drawbacks as poor adhesion, any improvement in these respects, especially if not at the expense of the electrical properties, will also be desirable, particularly so in flexible electroluminescent panels such as shown in U.S. Patent 2,774,004. Improved strength also is very important in capacitor applications where cyanoethylated cellulose finds utility by virtue of its high dielectric constant. Very thin films (less than 1 mil) are employed in capacitors and they must have adequate strength to survive handling during manufacture. Previous attempts to make capacitors of specific types have encountered some difficulties along this line.

It is, therefore, a principal object of the present invention to develop an HCC composition suitable for use for such dielectric purposes as the preparation of phosphor-bearing matrices and the like without being subject to the noted physical difficulties of the inadequacy to disperse the phosphor and the poor adhesion and relatively low strength. This has been accomplished in a relatively simple but surprisingly successful manner.

In general, the desired result is preferably accomplished by the provision of a mixture essentially containing from about 50 to about 95 percent HCC and from about 50 to about 5 percent cyanoethylated hydroxyethyl cellulose. Hydroxyethyl cellulose for purposes of simplification, is hereinafter noted by the abbreviation "HEC."

It is quite surprising that the inclusion of even as little as about 5 percent of cyanoethylated HEC (hereinafter referred to as "CHC") in the final cyanoethylated composition is helpful in obtaining the desired result. Ten percent produces a very marked improvement. Usually from about 25 to about 50 percent will be used to produce the desired result. The cyanoethylated composition of the present invention advantageously is, surprisingly, soluble in highly polar organic solvents such as acetonitrile, acetone and dimethylformamide. In solution it can be cast or sprayed into a strong clear uniform film which is adhesive to conductive glass.

The present invention contemplates compositions of HCC and CHC, however prepared. For example, HCC and CHC may be separately prepared, purified and then admixed in the desired proportions. This is perhaps the least desirable method since it involves two entirely separate physical set-ups as well as duplication of all purification procedures. For compositions containing small percentages of either CHC or HCC, however, this procedure may often be practical.

A somewhat better procedure is, first, to conduct the cyanoethylation of the cellulose and the HEC as separate operations; then, before precipitation and washing, combine the requisite amounts of each reacted mixture to give the desired final product; and then precipitate and wash the combination product. It is found that this type of operation makes it easier to obtain the desired combination of electrical properties.

"CHC" for use in these procedures is not a new product with the present application, being fully disclosed in commonly assigned copending application Serial No. 130,768 of Fugate and McClenachan filed of even date, herewith. Likewise, HCC is a well-known material which can be prepared from cellulose by any of the several known cyanoethylated procedures. One procedure, shown for example in U.S. Patent 2,332,049, wherein cellulose is reacted with acrylonitrile in the presence of alkali to yield HCC, which is then precipitated and washed or otherwise isolated.

While good products can be obtained by the foregoing procedures, the preferred procedure, however, is to admix cellulose and HEC in the desired proportions; conjointly cyanoethylate by conventional means; and conjointly precipitate and wash exactly as in treating cellulose by itself by known methods. It is not certain what mechanism produces the effect which is obtained in this conjoint cyanoethylating, precipitating and purifying operation, but the product is superior to the same composition obtained in any other way presently known.

Cellulose suitable for use in the latter method may be a natural cellulosic fiber or one of the available forms of regenerated cellulose. Several forms of both are commercially-available, as for example cotton linters, viscose rayon and the like. Within reasonable limits any of such available products may be used. Wherever it is available, regenerated cellulose is perhaps preferable because it can be obtained in fibers of uniform size. This simplifies some of the mechanical handling problems.

HEC for the preparation of the compositions of the present invention is a known material which may be obtained from any suitable source. The commercially available materials are generally prepared by the reaction of ethylene oxide with sodium cellulose. In this matter hydroxyethyl as well as hydroxyl terminated polyethoxy groups are substituted onto the cellulosic backbone. The extent of hydroxyethylation, i.e., the number of moles of ethylene oxide per anhydroglucose unit, herein termed "MS," and the degree of polymerization (i.e. "DP") of the cellulose determines the properties of the HEC. In general, those HEC materials having an MS of between about 0.25 and 4.2 and preferably between about 1.0 and 1.75 and a DP of about 100 to about 2500 and preferably between about 500 to 2000 have been found to have desirable characteristics. The DP and MS values can vary independently over a wide range. However, those HEC materials having DP and MS values such that the viscosity of a 2% aqueous solution thereof at 20° C., is between five and about 500 centipoises and preferably between about 50 and 125 centipoises at 20° C., are the most practical since they present the least number of mechanical handling problems during the cyanoethylation process.

Any of the aforementioned forms of natural or regenerated cellulose is suitable for the preparation of the HEC.

The invention will be more fully discussed in conjunction with the following illustrative examples. The latter show the method of operation as well as the products. Therein, unless otherwise noted, all parts and percentages are by weight and all temperatures are expressed in degrees centigrade.

EXAMPLE 1

To a suspension of 120 g. of regenerated cellulose in 3 liters of acrylonitrile held at 50° C., is added dropwise over a five minute period an aqueous solution of 6.0 g. of sodium hydroxide. The total water content of the reaction mixture amounts to 120 g. Agitation is continued at 50° C. for 4 hours at which time the mixture is neutralized with acetic acid. The cyanoethylated cellulose has completely dissolved in the excess acrylonitrile during this period. The resultant solution is filtered under pressure and then added dropwise to a stirred vessel containing boiling water. Acrylonitrile is thereby steam-distilled causing the cyanoethylated cellulose to precipitate as a white, fibrous solid. The product is washed repeatedly with water and then dried. Analysis shows a nitrogen content of 12.6%.

EXAMPLE 2

In a 2-liter flask equipped with an air-stirrer, reflux condenser, thermometer and pressure equalized dropping funnel are placed 1200 grams of acrylonitrile, 47 grams of distilled water in which 3 grams of NaOH had been dissolved and 60 g. of HEC (having an MS of 1.33 and whose 2% aqueous solution at 20° C. has a viscosity of 275±50 cent.). The mixture becomes very viscous and remains at 45° C. for 2 hours. The temperature begins to drop at this point and is raised to 60° C. for 2 additional hours. 12.5 g. of acetic acid are thereupon added to stop the reaction. The thick solution is suction filtered through a sintered glass funnel, then precipitated into boiling water, washed thoroughly with distilled water and dried. The somewhat gummy product is then dissolved in acetone and twice reprecipitated into methanol. Finally vacuum drying gives a clear, tough, hard solid having a nitrogen content of 11.3%.

EXAMPLE 3

The procedure of Example 1 is repeated except that the charge consists of 93 g. of cellulose and 36 g. of HEC of the type used in Example 2. The reaction proceeds in exactly the same fashion as in Example 1 and no difference is observed in either the rate of reaction or the ease of purification of the product.

EXAMPLE 4

The procedure of Example 3 is repeated except the charge consists of 93 g. of cellulose and 36 g. of HEC (having an MS of 1.33 and whose 2% aqueous solution at 20° C. has a viscosity of 95±20 cent.). This mixture behaves like the product of Example 3 in respect of reaction, purification and appearance of the resulting product.

EXAMPLE 5

The procedure of Example 3 is repeated using a mixture comprising 36 g. of HEC, a 2% aqueous solution of which at 20° C. has a viscosity of 10±2 centipoises and 93 g. of cellulose.

EXAMPLE 6

The procedure of Example 3 is repeated using a mixture comprising 93 g. of cellulose and 3 g. of HEC of the type used in Example 3. The product is similar in appearance to the product of Example 3.

EXAMPLE 7

Solutions having 10% dissolved solids are made up from products of the previous examples using acetonitrile as solvent. These solutions are cast on lead foil and allowed to dry first at 40° C. for four hours and then for 1 hour at 70° C. giving films having a thickness of approximately 2 mils. The electrical properties were then measured at 25° and 60 cycles per second, with the lead foil being used as one of the electrodes.

The results obtained in the preceding Examples 2–4 are summarized in the following table.

*Table I*

| Product from Example | Dielectric Constant | Dissipation Factor |
|---|---|---|
| 2 | 19.1 | 0.150 |
| 3 | 11.2 | 0.017 |
| 4 | 11.1 | 0.020 |

EXAMPLE 8

Additional films of cyanoethylated cellulose and of mixtures of HCC and of CHC are cast by the procedure of Example 7 on the conductive surface of a "conductive glass" sheet. This surface is comprised essentially of tin oxide and has a resistance of 100 ohms per square. (Such glass is described in "Materials and Methods," August 1956.) The dried films are conditioned at 23° C. and 50% relative humidity and the strength of the adhesive bond of the cyanoethylated product to the conductive glass is measured by peeling off one-inch wide films at an angle of 180° C. using a commercially-available Instron instrument. Results are shown in Table II.

*Table II*

| Product from Example— | Adhesion, grams/in. width |
|---|---|
| 1 | 2.5. |
| 2 | Too high to measure. |
| 3 | Adhesion is greater than tensile strength. |

A significant improvement by the presence of the CHC is thus observed. The adhesion of the product of Example 1 is so unsatisfactory that the film frequently peels off during drying. This is especially true if the initial drying rate is increased by the use of a higher drying temperature.

This application is a continuation-in-part of our application Serial No. 129,977, filed August 8, 1961, now abandoned.

We claim:

1. A novel composition of matter consisting essentially of from about 5 to about 50 weight percent of the total composition of cyanoethylated hydroxyethyl cellulose and from about 50 to about 95 weight percent of cyanoethylated cellulose, each of said cyanoethylated materials having a degree of substitution of at least about 2.0, said composition being further characterized by a high dielectric constant and a low dissipation factor.

2. A composition according to claim 1 in which each of said cyanoethylated substituents has a degree of substitution of at least about 2.3.

3. A composition according to claim 1 in which said cyanoethylated hydroxyethyl cellulose content is from about 10 to about 40 weight percent, said cyanoethylated cellulose content constituting substantially the entire remainder of the composition.

4. The method of preparing a composition of matter having a high dielectric constant and a low dissipation factor which comprises; combining from about 5 to about 50 parts by weight of hydroxyethyl cellulose with a sufficient amount of cellulose to provide a total of about one-hundred parts by weight; reacting resultant mixture with excess acrylonitrile in the presence of an alkali metal hydroxide until the reacted material has a degree of substitution of at least about 2.0; neutralizing the resultant solution; conjointly precipitating the cyanoethylated material, washing with resultant precipitated material to a residual electrolyte content of less than 200 parts per million and collecting the washed product.

References Cited in the file of this patent

UNITED STATES PATENTS 2,918,594     Fridrich     Dec. 22, 1959

FOREIGN PATENTS 636,295     Great Britain     Apr. 26, 1950